(12) United States Patent
Hong (10) Patent No.: US 9,455,629 B1
(45) Date of Patent: Sep. 27, 2016

(54) CURRENT COMPENSATION CIRCUIT AND LIGHT APPARATUS COMPRISING THE SAME

(71) Applicant: Magnachip Semiconductor, Ltd., Cheongju-si (KR)

(72) Inventor: Seung Woo Hong, Seoul (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 15/079,210

(22) Filed: Mar. 24, 2016

(30) Foreign Application Priority Data

Mar. 27, 2015 (KR) .......... 10-2015-0043596

(51) Int. Cl.
| H05B 41/28 | (2006.01) |
| H02M 3/156 | (2006.01) |
| H05B 33/08 | (2006.01) |

(52) U.S. Cl.
CPC ......... *H02M 3/156* (2013.01); *H05B 33/0815* (2013.01); *H05B 33/0818* (2013.01)

(58) Field of Classification Search
CPC .......... H05B 33/0815; H05B 37/0281; H05B 41/2828; H05B 41/2824; H05B 41/2853; H05B 41/292; H05B 41/2981

USPC ..... 315/247, 224, 225, 185 S, 307–326, 291
See application file for complete search history.

(56) References Cited

U.S. PATENT DOCUMENTS

| 2011/0133662 A1* | 6/2011 | Yan | H05B 33/0815 315/224 |
| 2015/0015162 A1* | 1/2015 | Kumada | H05B 33/0815 315/291 |

\* cited by examiner

*Primary Examiner* — Tuyet Vo (57) ABSTRACT

The present disclosure relates to a circuit compensation circuit includes a current compensator configured to perform a charging or a discharging of a capacitive element according to whether a sensing voltage is less than or greater than a certain voltage and to delay a turn-off point of a driving switching element until a corresponding discharging quantity is identical to a corresponding charging quantity and a switching controller configured to provide a switching control signal at the delayed turn-off point of the driving switching element. The present disclosure also relates to a light emitting diode apparatus that includes such a current compensation circuit, and a related method of driving such a current compensation circuit.

19 Claims, 4 Drawing Sheets

CURRENT COMPENSATION CIRCUIT AND LIGHT APPARATUS COMPRISING THE SAME

CROSS-REFERENCE TO RELATED APPLICATION(S)

This application claims the benefit under 35 USC 119(a) of Korean Patent Application No. 10-2015-0043596 filed on Mar. 27, 2015 in the Korean Intellectual Property Office, the entire disclosure of which is incorporated herein by reference for all purposes.

BACKGROUND

1. Field

The following description relates to a driving method of a current compensation circuit. The following description also relates to a current compensation circuit and a light apparatus having such a current compensation circuit to accurately control an average driving current regardless of changes of an input voltage and an output voltage.

2. Description of Related Art

A Light Emitting Diode (LED) light apparatus may be driven using a switching converter method and a switching converter may be classified according to a Buck-type, a Boost-type and a Buck-Boost-type. Here, a Buck-type converter is a voltage step down and a current step up converter, a Boost-type converter is a DC-to-DC power converter with an output voltage greater than its input voltage, and a Buck-Boost type converter is a converter that is able to operate in multiple modes, and so is able to act as a Buck-type converter or a Boost-type converter. In alternative technologies a switching converter of the Boost-type was mostly used, but recently the Buck-type is being used for cost reduction of an integrated circuit (IC). Thus, a type of a switching converter may be classified according to a ratio of an input voltage and an output voltage, as discussed above, and may include a Metal-Oxide-Semiconductor Field Effect Transistor (MOSFET) in order to provide an average inductor current mode method.

An LED light apparatus may be driven by a high efficiency light apparatus driving circuit that includes a MOSFET. An ideal MOSFET immediately turns on when a driving current that drives a LED module reaches a zero value. However, a real MOSFET may have a time delay between a point at which a driving current reaches a zero value and a turn-on point of the MOSFET. Therefore, when an LED light apparatus is driven by a real MOSFET, a minimum value of a driving current may correspond to a negative value. Accordingly, an average driving current may decrease compared with an ideal MOSFET.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a current compensation circuit includes a current compensator configured to perform a charging or a discharging of a capacitive element according to whether a sensing voltage is less than or greater than a certain voltage and to delay a turn-off point of a driving switching element until a corresponding discharging quantity is identical to a corresponding charging quantity, and a switching controller configured to provide a switching control signal at the delayed turn-off point of the driving switching element.

The current compensator may include an error amplifier configured to compare the sensing voltage with the certain voltage to determine whether to perform charging or discharging of the capacitive element.

The current compensator may charge a current generated due to a difference between the certain voltage and the sensing voltage into the capacitive element in response to the sensing voltage being less than the certain voltage.

The current compensator may discharge a current generated due to a difference between the certain voltage and the sensing voltage from the capacitive element in response to the sensing voltage being greater than the certain voltage.

The current compensator may receive the sensing voltage generated from a driving current passing through the driving switching element into the error amplifier in response to the driving switching element being turned on.

The error amplifier may amplify a difference between the sensing voltage and the certain voltage to charge or discharge the capacitive element based on an output of the error amplifier.

The current compensator may provide an identical compensation voltage at a turn-on point and a turn-off point of the driving switching element in response to the discharging quantity being identical to the charging quantity.

The switching controller may include a trigger module configured to provide a trigger signal for turning on the driving switching element in response to the driving current reaching a certain current.

The switching controller may provide the switching control signal for turning on the driving switching element based on the trigger signal.

The switching controller may include a pulse width control module configured to generate a pulse width control signal for turning off the driving switching element in response to the sensing voltage reaching a compensation voltage applied to both terminals of the capacitive element.

The switching controller may provide the switching control signal for turning off the driving switching element based on the pulse width control signal.

The switching controller may include a storage element configured to provide an output value for turning on or turning off the driving switching element based on an output change point of the trigger module or the pulse width control module.

The certain voltage may correspond to an average of a maximum peak level and a minimum peak level of the sensing voltage.

In another general aspect, a light emitting diode light apparatus includes a Light Emitting Diode (LED) module, an inductor connected in series to the LED module, a driving switching element connected in series to the inductor, and a current compensation circuit configured to control a turn-off point of the driving switching element to control an average current flowing through the inductor based on a sensing voltage generated by a driving current that drives the LED module, wherein the current compensation circuit includes a current compensator configured to perform a charging or a discharging of a capacitive element according to whether a sensing voltage is less than or greater than a certain voltage and to delay a turn-off point of the driving switching element until a corresponding discharging quantity is identical to a corresponding charging quantity, and a switching controller configured to provide a switching control signal at the delayed turn-off point of the driving switching element.

In another general aspect, a driving method of a current compensation circuit includes receiving a sensing voltage generated by a driving current passing through a driving switching element, charging or discharging of a capacitive element according to whether a sensing voltage is less than or greater than a certain voltage, and delaying a turn-off point of the driving switching element until a discharge quantity of the capacitive element is identical to a charge quantity of the capacitive element.

The driving method may further include comparing the sensing voltage with the certain voltage to determine whether to perform charging or discharging of the capacitive element.

The charging may include charging a capacitive element with a current generated due to a difference between the certain voltage and the sensing voltage, in response to the sensing voltage being less than the certain voltage.

The discharging may include discharging a current from the capacitive element generated due to a difference between the certain voltage and the sensing voltage, in response to the sensing voltage being greater than the certain voltage.

The certain voltage may correspond to an average of a maximum peak level and a minimum peak level of the sensing voltage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

While terms such as "first," "second," and the like, may be used to describe various components, such components are not be understood as being limited to the terms. The terms are merely used to help the reader to distinguish one component from another.

It is to be understood that when an element is referred to as being "connected to" or "connected with" another element, the element may be directly connected to the other element or intervening elements may also be present. In addition, unless explicitly described to the contrary, the word "comprise" and variations such as "comprises" or "comprising," or synonyms such as "including" or "having," are to be understood to imply the inclusion of stated elements but not the exclusion of any other elements. Meanwhile, other expressions describing relationships between components such as "between", "immediately between" or "adjacent to" and "directly adjacent to" are to be construed similarly.

Singular forms "a", "an" and "the" in the present disclosure are intended to include the plural forms as well, unless the context clearly indicates otherwise.

Devices that are in communication with each other are not required to be in continuous communication with each other, unless expressly specified otherwise. In addition, devices that are in communication with each other possibly communicate directly or possibly communicate indirectly through one or more intermediaries.

Although process steps, method steps, algorithms, or the like, are possibly described as having a sequential order in certain embodiments, such processes, methods and algorithms may be configured to work in alternate orders in other embodiments. In other words, any sequence or order of steps that is described does not necessarily indicate a requirement that the steps be performed in that order. Thus, the steps of the processes, methods or algorithms described herein are potentially performed in any order practical. Furthermore, some steps are possibly performed simultaneously.

When a single device or article is described herein, it is to be readily apparent that more than one device or article is possibly used instead of a single device or article. Similarly, when more than one device or article is described herein, it is to be readily apparent that a single device or article is possibly used in place of the more than one device or article. The functionality or the features of a device is also possibly alternatively embodied by one or more other devices that are not explicitly described as having all of the functionality or features included in another embodiment.

According to one embodiment, a current compensation circuit and light apparatus having the current compensation circuit accurately control an average driving current regardless of changes of an input voltage and an output voltage.

According to one embodiment, a current compensation circuit and light apparatus having the current compensation circuit control an average value of a sensing voltage to charge and discharge a capacitive element and to accordingly delay a turn-off point of a driving switching element.

According to one embodiment, a current compensation circuit and light apparatus having the current compensation circuit use an average current mode control method to operate a light emitting diode.

Figure 1:
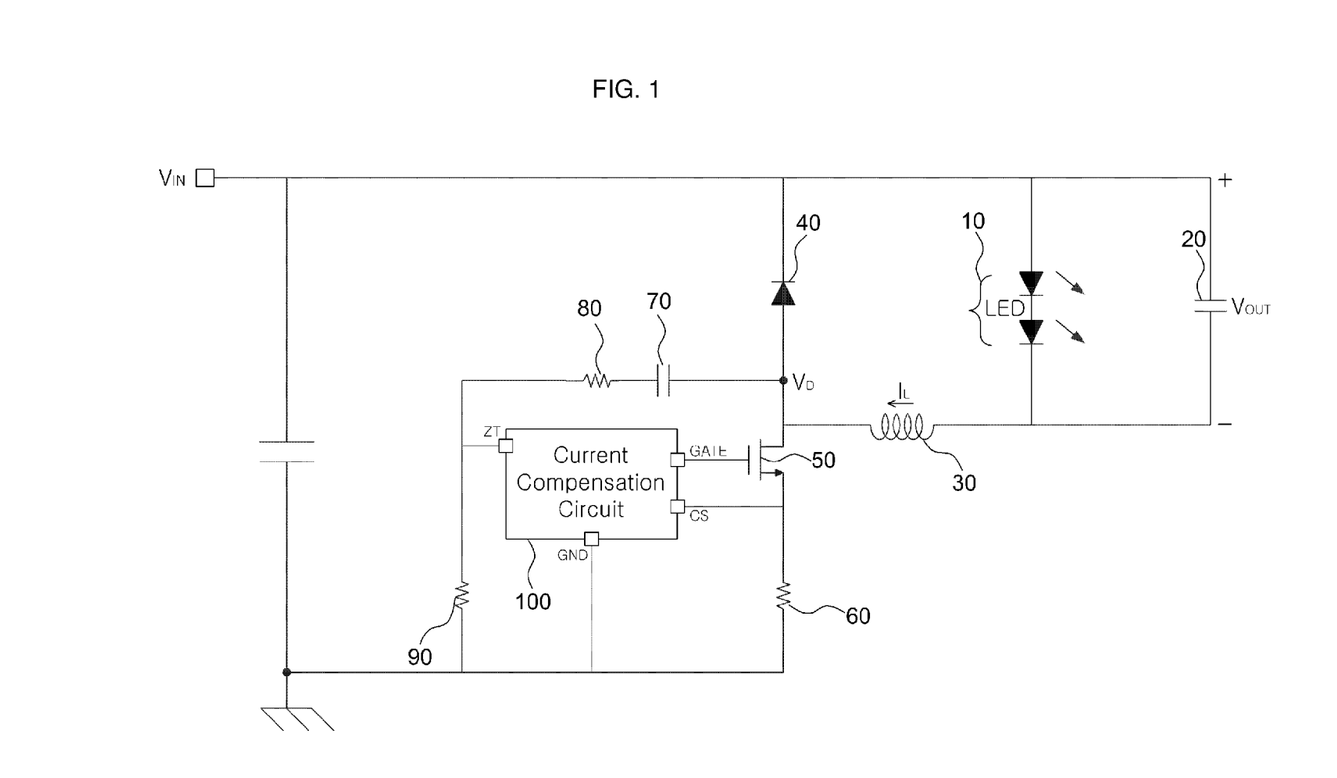
FIG. 1 is a circuit diagram illustrating a current compensation circuit and light apparatus having the same according to an embodiment.

FIG. 1 is a circuit diagram illustrating a current compensation circuit and light apparatus having the current compensation circuit according to an embodiment.

Referring to the example of FIG. 1, a light emitting diode light apparatus includes a LED module 10, an output capacitor 20, an inductor 30, a diode 40, a driving switching element 50, a sensing resistance 60 and a coupling capacitor 70, a first distribution resistance 80, a second distribution resistance 90 and a current compensation circuit 100.

A light emitting diode light apparatus is provided with an input voltage $V_{IN}$ from an input power supply. That is, an input power supply corresponds to a source of an input voltage $V_{IN}$. An input voltage $V_{IN}$ corresponds to a DC voltage $V_{DC}$ or an AC voltage $V_{AC}$. When an input voltage $V_{IN}$ corresponds to a DC voltage $V_{DC}$, an input power supply provides a stable direct current (DC) power supply $V_{DC}$. Whereas, when an input voltage $V_{IN}$ corresponds to an AC voltage $V_{AC}$, a frequency of an alternating input voltage $V_{IN}$ corresponds to, but is not necessarily limited to, a frequency of 50 Hz or 60 Hz according to voltage supplied by, for example, an electric power provider.

According to one embodiment, a light emitting diode light apparatus is driven through a switching converter method. In one embodiment, the light emitting diode light apparatus is formed using a Buck-type converter. However, embodiments are not limited to a Buck-type converter, and in other embodiments the light emitting diode light apparatus is formed through using a Boost-type or using a Buck-Boost-type.

The LED module 10 is formed into n groups, where n is a natural number. The LED module 10 may include various LEDs connected in structures such as a series, parallel and series-parallel connections. In this embodiment, the LED module 10 is driven by receiving an input voltage $V_{IN}$. Such a light emitting diode light apparatus controls an output voltage $V_{OUT}$ and a driving current $I_L$ to regulate a luminance of the LED module 10.

In the example of FIG. 1, the output capacitor 20 is connected in parallel with the LED module 10. The driving current $I_L$ drives the LED module 10 by the voltage $V_{OUT}$, which is applied to both terminals of the output capacitor 20. That is, the output voltage $V_{OUT}$ corresponds to a voltage applied to both terminals of the output capacitor 20. Accordingly, the driving current $I_L$ drives the LED module 10. Thus, when a driving switching element 50 is turned on, the driving current $I_L$ corresponds to a current that passes through the driving switching element 50.

In the example of FIG. 1, the inductor 30 is connected in series with the LED module 10 and the output capacitor 20. Also, the driving switching element 50 is connected in series with the inductor 30 and the diode 40. In the example, the driving switching element 50 is located between the inductor 30 and the current compensation circuit 100. Here, the driving switching element 50 receives a switching control signal from a current compensation circuit 100 to accordingly be turned on or turned off. When the driving switching element 50 is turned on, the driving current $I_L$ flows through the sensing resistance 60 and when the driving switching element 50 is turned off, the driving current $I_L$ flowing through the sensing resistance 60 is cut off. Therefore, a light emitting diode light apparatus according to one embodiment controls the output voltage $V_{OUT}$ and the driving current $I_L$ by using a switching control signal.

In the example of FIG. 1, when the driving switching element 50 is turned on, the driving current $I_L$ flows through the driving switching element 50 and the inductor 30 is charged by the driving current $I_L$. Alternatively, when the driving switching element 50 is turned off, a current charged in the inductor 30 is discharged to flow into the LED module 10 through the diode 40. Thus, while the driving switching element 50 is turned off, the inductor 30 operates as a current source of the driving current $I_L$.

In one embodiment, the driving switching element 50 is formed using a power MOSFET. When the driving switching element 50 is formed using a Power MOSFET, a switching control signal is transmitted into a gate terminal of the Power MOSFET through a GATE pin to accordingly control a flow of a driving current $I_L$. For example, a switching control signal turns on the driving switching element 50 in an example of a positive value of the switching control signal, such as a high level or 1, and turns off a driving switching element 50 in case of a negative value of the switching control signal, such as a low level or 0.

A sensing resistance 60 is electrically connected to a driving switching element 50 and a current compensation circuit 100. For example, the sensing resistance 60 may be provided by a resistor. A voltage $V_{CS}$ applied to both terminals of the sensing resistance 60 is applied to a current compensation circuit 100 through a CS pin. That is, the sensing resistance 60 is connected to a terminal of the driving switching element 50 for sensing the driving current $I_L$.

In the example of FIG. 1, a coupling capacitor 70 is electrically connected to the inductor 30 and the driving switching element 50. The coupling capacitor 70 cuts off a direct current component of a driving current $I_L$ and passes an alternating current component. In one embodiment, when the driving switching element 50 is formed to include a power MOSFET, if the driving current $I_L$ reaches a zero value, the drain voltage $V_D$ of the power MOSFET rapidly decreases. The coupling capacitor 70 passes an alternating current component in order to detect a section in which the drain voltage $V_D$ rapidly decreases.

In one embodiment, when the driving current $I_L$ reaches a zero value, the current compensation circuit 100 provides a switching control signal in order to turn on the driving switching element 50. More specifically, when the driving current $I_L$ reaches a zero value, the voltage applied to both terminals of the inductor 30 also has a zero value. However, because a time difference between a point at which the driving current $I_L$ reaches a zero value and a point corresponding to $V_D = V_{IN} - V_{OUT}$ at which a voltage applied to both terminals of the inductor 30 is a zero value occurs, a turn-on of a driving switching element 50 may be delayed. Accordingly, the current compensation circuit 100 delays a turn-off point of the driving switching element 50 to accurately control an average driving current.

In the example of FIG. 1, the first distribution resistance 80 and the second distribution resistance 90 are connected in series to a coupling capacitor 70. For example, the first distribution resistance 80 may be provided by a resistor, and the second distribution resistor 90 may be provided by a resistor. Also, a ZT pin is located between the first distribution resistance 80 and the second distribution resistance 90. In one embodiment, the first distribution resistance 80 and the second distribution resistance 90 distribute a voltage of an alternating current component that passes through the coupling capacitor 70. For example, a voltage $V_{ZT}$ applied to the ZT pin is regulated based on a ratio of a resistance value of the first distribution resistance 80 and a resistance value of the second distribution resistance 90. For example, when the ratio of the resistance value of a first distribution resistance 80 and the resistance value of the second distribution resistance 90 is 9:1, the voltage $V_{ZT}$ applied to the ZT pin correspond to a tenth part, or 10%, of the alternating current component voltage passing through the coupling capacitor 70. In one embodiment, a ratio of a resistance value of a first distribution resistance 80 and a second distribution resistance 90 is predetermined according to the level of the input voltage $V_{IN}$. Because the current compensation circuit 100 operates at a considerably lower voltage than the input voltage $V_{IN}$ received from the input power supply, the first distribution resistance 80 and the second distribution resistance 90 prevent an overload of a current compensation circuit 100.

Figure 2:
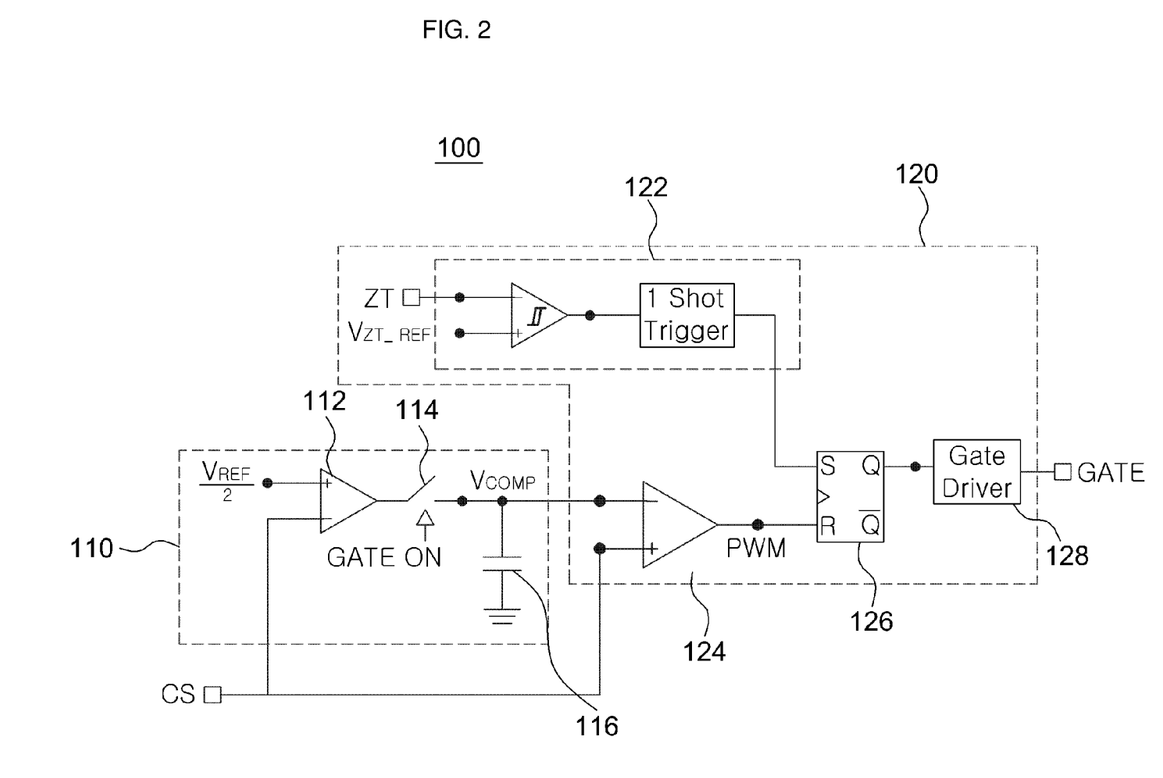
FIG. 2 is a circuit diagram illustrating a composition of a current compensation circuit in the embodiment of FIG. 1.

FIG. 2 is a circuit diagram illustrating a composition of a current compensation circuit in the embodiment of FIG. 1.

Referring to the example of FIG. 2, a current compensation circuit 100 includes a current compensation unit or current compensator 110 and a switching control unit or switching controller 120.

In the example of FIG. 2, a current compensator 110 includes an error amplifier 112, a charge switching element 114 and a capacitive element 116. However, additional appropriate elements are optionally present in other embodiments. The current compensator 110 receives the sensing voltage $V_{CS}$ generated by the driving current $I_L$ passing through the driving switching element 50 through the CS pin. Also, a sensing voltage $V_{CS}$ is provided to the error amplifier 112 through the CS pin. That is, when the driving switching element 50 is turned on, the error amplifier 112 of the current compensator 110 receives the sensing voltage $V_{CS}$ generated by the driving current $I_L$ that passes through the driving switching element 50.

The current compensator 110 performs a charging or a discharging of the capacitive element 116 according to whether the sensing voltage $V_{CS}$ is less than or greater than a certain voltage. Accordingly, in such an example, the current compensator 110 delays a turn-off point of the driving switching element 50 until a point in time at which a corresponding discharging value is identical to a corresponding charging value.

In one embodiment, the certain voltage corresponds to one half of a reference voltage, or $\frac{1}{2}*V_{REF}$. For example, such a reference voltage $V_{REF}$ is predetermined by a designer and a light emitting diode light apparatus compensates for a current based on such a reference voltage $V_{REF}$. Further, in such an example, when a turn-on of the driving switching element 50 is delayed, the driving current $I_L$ decreases up to a minimum peak level that corresponds to a negative value. When the driving switching element 50 is turned on, the driving current $I_L$ increases with a constant slope. However, a light emitting diode light apparatus compensates for a positive current that is identical to a negative current generated by a turn-on delay of the driving switching element 50. More specifically, the light emitting diode light apparatus controls a maximum peak level of a sensing voltage $V_{CS}$ in order to compensate for the driving current $I_L$. A difference between the sensing voltage $V_{CS}$ of a minimum peak level and a zero voltage value corresponds to the difference between the sensing voltage $V_{CS}$ of a maximum peak level and the reference voltage $V_{REF}$. Therefore, the light emitting diode light apparatus increases a maximum peak level of the sensing voltage $V_{CS}$ more than the reference voltage $V_{REF}$ to cause the light emitting diode light apparatus to compensate for the driving current $I_L$.

Also, in the example of FIG. 2, the error amplifier 112 receives the certain voltage and the sensing voltage $V_{CS}$. In one embodiment, the certain voltage corresponds to one half of a reference voltage $\frac{1}{2}*V_{REF}$ and the sensing voltage $V_{CS}$ is received through the CS pin. The error amplifier 112 compares the sensing voltage $V_{CS}$ with the certain voltage, such as $V_{REF}/2$, to determine whether the capacitive element 116 is charged or discharged. More specifically, when the sensing voltage $V_{CS}$ is less than the certain voltage $V_{REF}/2$, the error amplifier 112 charges the capacitive element 116 with a current generated based on a difference between the certain voltage $V_{REF}/2$ and the sensing voltage $V_{CS}$. Alternatively, when the sensing voltage $V_{CS}$ is greater than the certain voltage $V_{REF}/2$, the error amplifier 112 discharges a current generated based on a difference between the sensing voltage $V_{CS}$ and the certain voltage $V_{REF}/2$ from the capacitive element 116. Therefore, an error amplifier 112 amplifies an error of the sensing voltage $V_{CS}$ and the certain voltage $V_{REF}/2$ to appropriately charge or discharge the capacitive element 116 based on the output of the error amplifier 112.

In the example, of FIG. 2, the charge switching element 114 is electrically connected to the output terminal of the error amplifier 112 and the terminal of the capacitive element 116. When the driving switching element 50 is turned on, the current compensator 110 provides a charge switching signal to the charge switching element 114. Accordingly, the charge switching element 114 receives the charge switching signal to be turned on.

When the charge switching element 114 is turned on, the capacitive element 116 is charged or discharged based on the output of the error amplifier 112. The current compensator 110 charges or discharges the capacitive element 116 in order to delay the turn-off point of the driving switching element 50, as discussed. In one embodiment, a capacitive element 116 may be formed using a capacitor.

In the example of FIG. 2, the switching controller 120 includes a trigger module 122, a pulse width control module 124, a storage element 126 and a gate driver 128. However, additional appropriate elements are optionally present in other embodiments. The switching controller 120 provides a switching control signal to the driving switching element 50 through a gate pin at a delayed turn-off point.

In the example of FIG. 2, the trigger module 122 compares a voltage $V_{ZT}$ applied through a ZT pin with a zero reference voltage $V_{ZT\_REF}$. When the driving current $I_L$ reaches a certain current, the trigger module 122 provides a trigger signal in order to turn on the driving switching element 50. In one embodiment, the certain current may correspond to a zero current value. When the driving current $I_L$ drops below the certain current, the drain voltage $V_D$ of the driving switching element 50 decreases and the coupling capacitor 70 passes an alternating current component of the driving current. That is, the trigger module 122 provides a trigger signal when a voltage applied through the ZT pin reaches the zero reference voltage $V_{ZT\_REF}$ and the trigger signal corresponds to an edge clock, in this example. However, because a time difference between a point in time in which a driving current $I_L$ reaches a zero value and a point in time at which the switching controller 120 turns on the driving switching element 50 based on a trigger signal operation occurs, a turn-on of the driving switching element 50 is possibly delayed.

Also, in the example of FIG. 2, the pulse width control module 124 compares the sensing voltage $V_{CS}$ with the compensation voltage $V_{COMP}$ that is applied to both terminals of the capacitive element 116 in order to generate the pulse width control signal. More specifically, the pulse width control module 124 receives the sensing voltage $V_{CS}$ through the CS pin and the compensation voltage $V_{COMP}$ through the current compensator 110. When the sensing voltage $V_{CS}$ reaches the compensation voltage $V_{COMP}$, the pulse width control module 124 generates the pulse width control signal to be provided to the storage element 126 in order to turn off the driving switching element 50.

In the example of FIG. 2, the storage element 126 is electrically connected to the trigger module 122 and the pulse width control module 124. Accordingly, the storage element 126 changes an output value based on the output change point of the trigger module 122 or the pulse width control module 124.

The gate driver 128 receives the output value of the storage element 126 in order to output the switching control signal. For example, the switching control signal is provided to the driving switching element 50 through a gate pin. In one embodiment, the gate driver 128 amplifies the output of the storage element 126 up to a voltage that is required to turn-on or turn-off the driving switching element 50. and outputs a switching control signal at a low impedance. For example, the gate driver 128 rapidly provides a switching control signal to the driving switching element 50 based on a change of an output value of the storage element 126.

In one embodiment, the storage element 126 is formed using an SR latch. For example, when the storage element 126 receives a trigger signal through an S terminal from the trigger module 122, the storage element 126 outputs a positive value, such as a high level or 1, accordingly turning on the driving switching element 50. However, when the storage element 126 receives a pulse width control signal through an R terminal from the pulse width control module 124, the storage element 126 outputs a negative value, such as a low level or 0, accordingly turning off the driving switching element 50. Thus, the gate driver 128 outputs the switching control signal based on the output value of the storage element 126.

Figure 3:
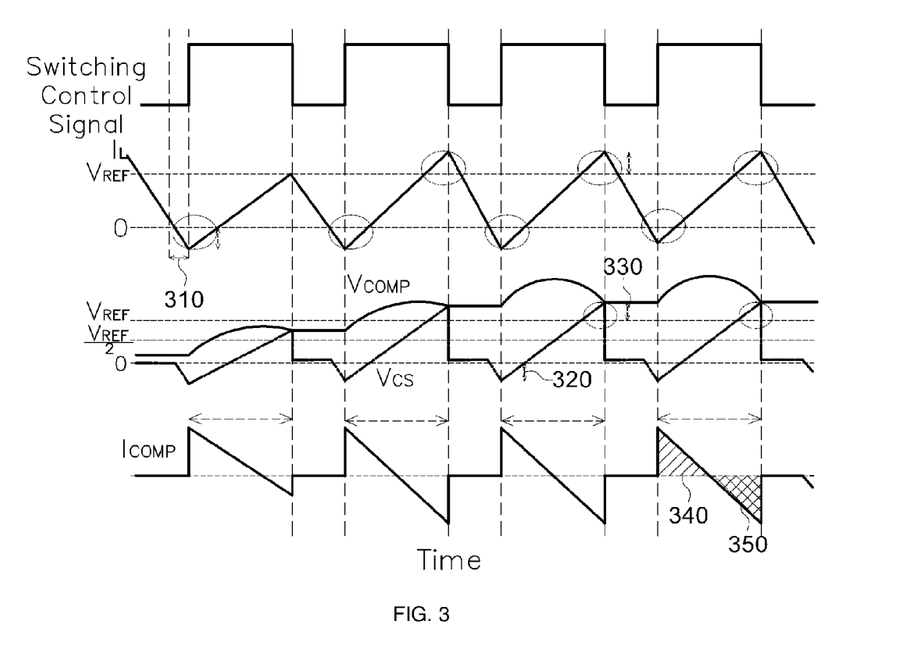
FIG. 3 is a waveform diagram illustrating an operation of a current compensation circuit and light apparatus having the current compensation circuit in the embodiment of FIG. 1.

FIG. 3 is a waveform diagram illustrating operation of a current compensation circuit and a light apparatus having the current compensation circuit in the embodiment of FIG. 1.

When the driving switching element 50 is turned on, the driving current $I_L$ flows through the driving switching element 50 and increases with a constant slope. In one embodiment, the constant slope of increase for the driving current $I_L$ is proportional to a voltage applied to a terminal between the inductor 30 and the LED module 10 and is inversely proportional to an inductance L of the inductor 30. For example, in the embodiment of FIG. 1, a voltage of $[V_{IN}-V_{OUT}]$ is applied between an inductor 30 and a LED module 10. That is, in such an embodiment, the slope of increase of the driving current $I_L$ corresponds to $[(V_{IN}-V_{OUT})/L]$, where L is an inductance.

However, the driving current $I_L$ flows into the LED module 10 through the diode 40 when the driving switching element 50 is turned off. Here, when the driving switching element 50 is turned off, the current charged into the inductor 30 is discharged. As a result, the driving current $I_L$ then decreases with a constant slope. In one embodiment, the slope decrease of the driving current $I_L$ is proportional to the voltage applied to both terminals of the LED module 10 and is inversely proportional to an inductance L of the inductor 30. For example, in the embodiment of FIG. 1, a voltage of $[V_{OUT}]$ is applied to both terminals of the LED module 10. That is, in such an embodiment, a slope of decrease of the driving current $I_L$ corresponds to $[-V_{OUT}/L]$, where L is an inductance.

In one embodiment, if the driving current $I_L$ drops below a certain current level, the drain voltage $V_D$ of the driving switching element 50 decreases and the certain current corresponds to a zero current level. More specifically, in such an embodiment, when the driving current $I_L$ reaches the zero current level, the voltage applied to both terminals of the inductor 30 is a zero voltage. However, because the time difference 310 between a point in time at which the driving current $I_L$ reaches a zero current level and a point in time at which the drain voltage $V_D$ is identical to the voltage $[V_{IN}-V_{OUT}]$ applied to both terminals of the inductor 30 and at which the LED module 10 operates, the turn-on time of the driving switching element 50 may be delayed.

In one embodiment, during a time where the drain voltage $V_D$ of the driving switching element 50 rapidly decreases, the turn-on delay time 310 of the driving switching element 50 occurs. Herein, the turn-on delay time 310 of the driving switching element 50 corresponds to a time interval from a point in time at which the driving current $I_L$ reaches a zero current value to a turn-on point in time for the driving switching element 50. Also, the turn-on delay time 310 corresponds to a time from a point in time at which the driving current $I_L$ reaches a zero current value to a point in time at which the switching controller 120 provides the switching control signal for turning on the driving switching element 50 based on the trigger signal. Therefore, the driving current $I_L$ continuously decreases after reaching a zero current value and reaches a minimum peak level at a turn-on point in time of the driving switching element 50.

In one embodiment, when the sensing voltage $V_{CS}$ is less than the certain voltage $V_{REF}/2$, the error amplifier 112 charges the compensation current $I_{COMP}$ into the capacitive element 116. However, when the sensing voltage $V_{CS}$ is greater than the certain voltage $V_{REF}/2$, the error amplifier 112 discharges the compensation current $I_{COMP}$ from the capacitive element 116. Here, the compensation current $I_{COMP}$ corresponds to the current generated due to a difference between the certain voltage $V_{REF}/2$ and the sensing voltage $V_{CS}$. Also, here, the compensation current $I_{COMP}$ corresponds to an output of the error amplifier 112.

In one embodiment, the compensation voltage $V_{COMP}$ applied to both terminals of the capacitive element 116 corresponds to a zero voltage value during a turn-off section of the driving switching element 50. When the sensing voltage $V_{CS}$ is less than the certain voltage $V_{REF}/2$, the compensation voltage $V_{COMP}$ increases based on a difference between the certain voltage $V_{REF}/2$ and the sensing voltage $V_{CS}$. Here, in this embodiment, the certain voltage $V_{REF}/2$ is predetermined to have a constant value and the rate of increase of the compensation voltage $V_{COMP}$ gradually decreases because the sensing voltage $V_{CS}$ increases with a constant slope. However, when the sensing voltage $V_{CS}$ is greater than the certain voltage $V_{REF}/2$, the compensation voltage $V_{COMP}$ decreases based on a difference between the certain voltage $V_{REF}/2$ and the sensing voltage $V_{CS}$. Here, a rate of decrease of the compensation voltage $V_{COMP}$ possibly gradually increases. Accordingly, when the sensing voltage $V_{CS}$ reaches the compensation voltage $V_{COMP}$, the pulse width control module 124 generates the pulse width control signal in order to turn off the driving switching element 50.

In one embodiment, the current compensator 110 delays a turn-off point of the driving switching element 50 until a corresponding discharge quantity of the capacitive element 116 is identical to a corresponding charge quantity. When the discharge quantity 350 of the capacitive element 116 is identical to the charge quantity 340, the current compensator 110 provides the identical compensation voltage $V_{COMP}$ at the turn-on point and turn-off point of that driving switching element 50. Accordingly, when a corresponding charge quantity of the capacitive element 116 is larger than a corresponding discharge quantity, the level of the compensation voltage $V_{COMP}$ is higher at a turn-off point of a driving switching element 50 than at a turn-on point of a driving switching element 50. Herein, a charge quantity and a discharge quantity of the capacitive element 116 correspond to an area of the compensation current $I_{COMP}$ waveform.

In one embodiment, when the sensing voltage $V_{CS}$ reaches a maximum peak level, the corresponding charge quantity 340 of the capacitive element 116 is identical to the corresponding discharge quantity 350, and the compensation voltage $V_{COMP}$ forms an identical waveform each cycle.

In one embodiment, when the sensing voltage $V_{CS}$ reaches a maximum peak level, the certain voltage $V_{REF}/2$ corresponds to an average of the maximum peak level and the minimum peak level of the sensing voltage $V_{CS}$. Here, in such an embodiment, the difference 320 of a zero voltage level and the sensing voltage $V_{CS}$ of the minimum peak level is identical to the difference 330 of the sensing voltage $V_{CS}$ of the maximum peak level and the reference voltage $V_{REF}$. For example, a light emitting diode light apparatus increases the maximum peak level of the sensing voltage $V_{CS}$ to compensate for a negative current generated as result of the turn-on delay time 310. Therefore, the light emitting diode light apparatus uses an average current mode control method to operate the light emitting diode or the LED module and also accurately controls the average driving current.

Figure 4:
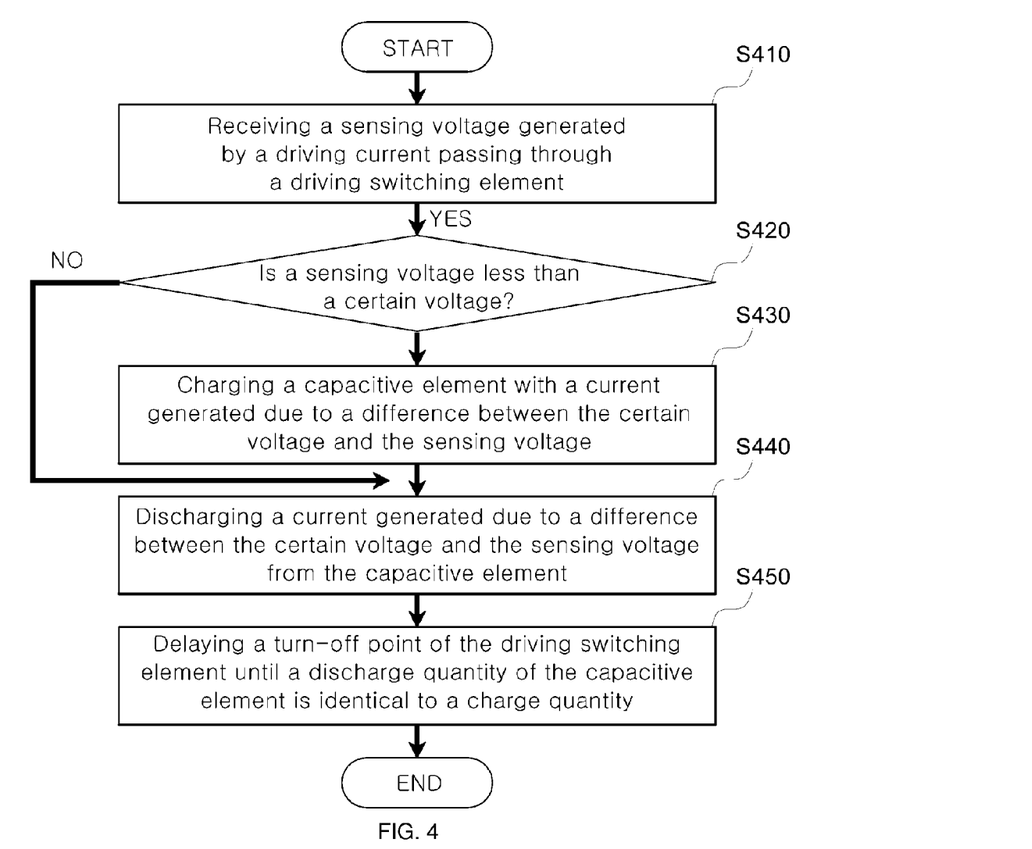
FIG. 4 is a flowchart diagram illustrating a driving method of a current compensation circuit and light apparatus having the current compensation circuit in the embodiment of FIG. 1.

FIG. 4 is a flowchart diagram illustrating a driving method of a current compensation circuit and light apparatus having the compensation circuit in the embodiment of FIG. 1.

In step S410, when the driving switching element 50 is turned on, the light emitting diode light apparatus senses the driving current $I_L$ passing through the driving switching element 50. More specifically, in an embodiment, the sensing resistance 60 is connected to a terminal of the driving switching element 50 and the current compensator 110 receives the sensing voltage $V_{CS}$ applied to both terminals of the sensing resistance 60 through the CS pin.

In step S420, the current compensator 110 compares the sensing voltage $V_{CS}$ with the certain voltage $V_{REF}/2$ to determine if a charging or a discharging of the capacitive element 116 is to occur.

In step S430, in one embodiment, when the sensing voltage $V_{CS}$ is less than the certain voltage $V_{REF}/2$, the error amplifier 112 charges the compensation current $I_{COMP}$ into the capacitive element 116. Here, the compensation current $I_{COMP}$ corresponds to a current generated due to the difference between the certain voltage $V_{REF}/2$ and the sensing voltage $V_{CS}$. Also, the compensation current $I_{COMP}$ corresponds to an output of the error amplifier 112.

In step S440, in one embodiment, when the sensing voltage $V_{CS}$ is greater than the certain voltage $V_{REF}/2$, the error amplifier 112 discharges the compensation current $I_{COMP}$ from the capacitive element 116.

In step S450, the current compensator 110 delays the turn-off point of the driving switching element 50 until the discharge quantity 350 of the capacitive element 116 is identical to the charge quantity 340 and the switching controller 120 provides the switching control signal at the delayed turn-off point of the driving switching element 50. More specifically, in such an embodiment, the storage element 126 receives the pulse width control signal PWM in order to output a negative value, such as a low level or 0, accordingly turning off the driving switching element 50 and the gate driver 128 outputs the switching control signal based on the output value of the storage element 126.

Therefore, the current compensation circuit 100 and the light apparatus having the current compensation circuit prevent a decrease of an average driving current caused by a turn-on delay time of the driving switching element. Such a current compensation circuit 100 accurately controls the average driving current regardless of change of the input voltage and the output voltage and uses an average current mode control method to operate the light emitting diode. Also, the current compensation circuit 100 controls the average value of the sensing voltage to charge and discharge the capacitive element and delays the turn-off point of the driving switching element.

The apparatuses, units, modules, devices, and other components illustrated in FIGS. 1-4 that perform the operations described herein with respect to FIGS. 1-4 are implemented by hardware components. Examples of hardware components include controllers, sensors, generators, drivers, memories, comparators, arithmetic logic units, adders, subtractors, multipliers, dividers, integrators, compensators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-4. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described herein with respect to FIGS. 1-4 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A current compensation circuit, comprising:
   a current compensator configured to perform a charging or a discharging of a capacitive element according to whether a sensing voltage is less than or greater than a certain voltage and to delay a turn-off point of a driving switching element until a corresponding discharging quantity is identical to a corresponding charging quantity; and
   a switching controller configured to provide a switching control signal at the delayed turn-off point of the driving switching element.

2. The current compensation circuit of claim 1, wherein the current compensator comprises an error amplifier configured to compare the sensing voltage with the certain voltage to determine whether to perform charging or discharging of the capacitive element.

3. The current compensation circuit of claim 2, wherein the current compensator charges a current generated due to a difference between the certain voltage and the sensing voltage into the capacitive element in response to the sensing voltage being less than the certain voltage.

4. The current compensation circuit of claim 2, wherein the current compensator discharges a current generated due to a difference between the certain voltage and the sensing voltage from the capacitive element in response to the sensing voltage being greater than the certain voltage.

5. The current compensation circuit of claim 2, wherein the current compensator receives the sensing voltage generated from a driving current passing through the driving switching element into the error amplifier in response to the driving switching element being turned on.

6. The current compensation circuit of claim 2, wherein the error amplifier amplifies a difference between the sensing voltage and the certain voltage to charge or discharge the capacitive element based on an output of the error amplifier.

7. The current compensation circuit of claim 1, wherein the current compensator provides an identical compensation voltage at a turn-on point and a turn-off point of the driving switching element in response to the discharging quantity being identical to the charging quantity.

8. The current compensation circuit of claim 1, wherein the switching controller comprises a trigger module configured to provide a trigger signal for turning on the driving switching element in response to the driving current reaching a certain current.

9. The current compensation circuit of claim 8, wherein the switching controller provides the switching control signal for turning on the driving switching element based on the trigger signal.

10. The current compensation circuit of claim 8, wherein the switching controller comprises a pulse width control module configured to generate a pulse width control signal for turning off the driving switching element in response to the sensing voltage reaching a compensation voltage applied to both terminals of the capacitive element.

11. The current compensation circuit of claim 10, wherein the switching controller provides the switching control signal for turning off the driving switching element based on the pulse width control signal.

12. The current compensation circuit of claim 10, wherein the switching controller comprises a storage element configured to provide an output value for turning on or turning off the driving switching element based on an output change point of the trigger module or the pulse width control module.

13. The current compensation circuit of claim 1, wherein the certain voltage corresponds to an average of a maximum peak level and a minimum peak level of the sensing voltage.

14. A light emitting diode light apparatus, comprising:
   a Light Emitting Diode (LED) module;
   an inductor connected in series to the LED module;
   a driving switching element connected in series to the inductor; and
   a current compensation circuit configured to control a turn-off point of the driving switching element to control an average current flowing through the inductor based on a sensing voltage generated by a driving current that drives the LED module, wherein the current compensation circuit comprises a current compensator configured to perform a charging or a discharging of a capacitive element according to whether a sensing voltage is less than or greater than a certain voltage and to delay a turn-off point of the driving switching element until a corresponding discharging quantity is identical to a corresponding charging quantity, and a switching controller configured to provide a switching control signal at the delayed turn-off point of the driving switching element.

15. A driving method of a current compensation circuit, comprising:

receiving a sensing voltage generated by a driving current passing through a driving switching element;

charging or discharging of a capacitive element according to whether a sensing voltage is less than or greater than a certain voltage; and delaying a turn-off point of the driving switching element until a discharge quantity of the capacitive element is identical to a charge quantity of the capacitive element.

16. The driving method of claim 15, further comprising: comparing the sensing voltage with the certain voltage to determine whether to perform charging or discharging of the capacitive element.

17. The driving method of claim 15, wherein the charging comprises charging a capacitive element with a current generated due to a difference between the certain voltage and the sensing voltage, in response to the sensing voltage being less than the certain voltage.

18. The driving method of claim 15, wherein the discharging comprises discharging a current from the capacitive element generated due to a difference between the certain voltage and the sensing voltage, in response to the sensing voltage being greater than the certain voltage.

19. The current compensation circuit of claim 15, wherein the certain voltage corresponds to an average of a maximum peak level and a minimum peak level of the sensing voltage.

* * * * *